(12) United States Patent
Greff et al.

(10) Patent No.: US 10,536,793 B2
(45) Date of Patent: Jan. 14, 2020

(54) METHOD FOR REPRODUCING SPATIALLY DISTRIBUTED SOUNDS

(71) Applicant: A-VOLUTE, Villeneuve d'Ascq (FR)

(72) Inventors: Raphael Nicolas Greff, Lille (FR); Hong Cong Tuyen Pham, Croix (FR)

(73) Assignee: A-VOLUTE, Villeneuve d'Ascq (FR)

( * ) Notice: Subject to any disclaimer, the term of this patent is extended or adjusted under 35 U.S.C. 154(b) by 0 days.

(21) Appl. No.: 16/334,333

(22) PCT Filed: Sep. 19, 2017

(86) PCT No.: PCT/EP2017/073565
§ 371 (c)(1),
(2) Date: Mar. 18, 2019

(87) PCT Pub. No.: WO2018/050905
PCT Pub. Date: Mar. 22, 2018

(65) Prior Publication Data
US 2019/0208349 A1    Jul. 4, 2019

(30) Foreign Application Priority Data

Sep. 19, 2016    (EP) .................................. 16306190

(51) Int. Cl.
*H04S 7/00*  (2006.01)
*G06F 3/16*  (2006.01)
(Continued)

(52) U.S. Cl.
CPC .............. *H04S 7/303* (2013.01); *G06F 3/165* (2013.01); *G10L 19/008* (2013.01); *G10L 19/02* (2013.01);
(Continued)

(58) Field of Classification Search
None
See application file for complete search history.

(56) References Cited

U.S. PATENT DOCUMENTS 8,295,493 B2   10/2012   Faller
8,374,365 B2   2/2013    Goodwin et al.
(Continued)

FOREIGN PATENT DOCUMENTS

| WO | 2004/077884 A1 | 9/2004 |
| WO | 2006/006809 A1 | 1/2006 |
| WO | 2008/113428 A1 | 9/2008 |

OTHER PUBLICATIONS

Vilkamo et al. "Directional Audio Coding: Virtual Microphone-Based Synthesis and Subjective Evaluation", Journal of the Audio Engineering Society, vol. 57, No. 9, Sep. 2009, pp. 709-724.
(Continued)

*Primary Examiner* — Curtis A Kuntz
*Assistant Examiner* — Kenny H Truong
(74) *Attorney, Agent, or Firm* — Womble Bond Dickinson (US) LLP

(57) ABSTRACT

The invention relates to a method for reproducing spatially distributed sounds of a multichannel audio signal comprising: receiving time-dependent input audio signals and performing a time-frequency transform; for each time-frequency tile, determining an active directional vector $\vec{D}_a$ and a reactive directional vector $\vec{D}_r$ from time-frequency representations of different input channels for said time-frequency tile, determining positions of virtual sound sources (VS1, VS2, VS3) with respect to the reference listening point (O) from the active directional vector $\vec{D}_a$ and the reactive directional vector $\vec{D}_r$, and determining frequency signal values to each virtual sound sources (VS1, VS2, VS3), and distributing time-frequency signal values of said virtual sound sources to electroacoustic transducers on the basis of a comparison between the positions of the virtual (Continued)

sound sources in the virtual spatial configuration and the actual positions of said electroacoustic transducers in an actual spatial configuration.

14 Claims, 8 Drawing Sheets

(51) Int. Cl.
    *H04R 29/00* (2006.01)
    *H04S 3/00* (2006.01)
    *G10L 19/008* (2013.01)
    *G10L 19/02* (2013.01)
    *H04R 5/02* (2006.01)
    *H04R 5/04* (2006.01)

(52) U.S. Cl.
    CPC ............... *H04R 5/02* (2013.01); *H04R 5/04* (2013.01); *H04R 29/008* (2013.01); *H04S 3/008* (2013.01); *H04S 7/40* (2013.01); *H04S 2400/01* (2013.01); *H04S 2400/11* (2013.01); *H04S 2400/15* (2013.01)

(56) References Cited

U.S. PATENT DOCUMENTS

| | | | |
|---|---|---|---|
| 8,379,868 | B2 | 2/2013 | Goodwin et al. |
| 8,705,750 | B2 | 4/2014 | Berge |
| 8,908,873 | B2 | 12/2014 | Herre et al. |
| 9,232,337 | B2 | 1/2016 | Greff et al. |
| 2006/0171547 | A1 | 8/2006 | Lokki et al. |
| 2007/0211170 | A1 | 9/2007 | Ramaswamy et al. |
| 2007/0269063 | A1 | 11/2007 | Goodwin et al. |
| 2008/0232616 | A1 | 9/2008 | Pulkki et al. |
| 2008/0232617 | A1 | 9/2008 | Goodwin et al. |
| 2009/0182564 | A1 | 7/2009 | Beack et al. |
| 2009/0296954 | A1 | 12/2009 | Hooley et al. |
| 2011/0050842 | A1 | 3/2011 | Saleh et al. |
| 2011/0283865 | A1 | 11/2011 | Collins |
| 2012/0230512 | A1* | 9/2012 | Ojanpera ................ H04R 3/00 381/92 |
| 2013/0022206 | A1 | 1/2013 | Thiergart et al. |
| 2014/0177844 | A1* | 6/2014 | Greff ..................... H04S 7/40 381/17 |
| 2015/0249899 | A1 | 9/2015 | Kuech et al. |
| 2015/0332682 | A1 | 11/2015 | Kim et al. |
| 2015/0332690 | A1 | 11/2015 | Kim et al. |

OTHER PUBLICATIONS

Vickers Earl, "Frequency-Domain Two-To Three-Channel Upmix for Center Channel Derivation and Speech Enhancement", 127th Convention of the Audio Engineering Society, Convention Paper 7917, Oct. 9-12, 2009, 24 pages.

Pulkki, Ville, "Spatial Sound Reproduction with Directional Audio Coding", Journal of the Audio Engineering Society, vol. 55, No. 6, Jun. 2007, pp. 503-516.

Merimaa et al., "Spatial Impulse Response Rendering I: Analysis and Synthesis", Journal of the Audio Engineering Society, vol. 53, No. 12, Dec. 2005, pp. 1115-1127.

Merimaa et al. "Correlation-Based Ambience Extraction from Stereo Recordings", 123th Convention of the Audio Engineering Society, Convention Paper 7282, Oct. 5-8, 2007, 15 pages.

International Telecommunication Union, "Multichannel Stereophonic Sound System with and without Accompanying Picture", Recommendation ITU-R BS.775-2, BS Series, Broadcasting service (sound), Jul. 2006, 13 pages.

International Search Report and Written Opinion received for PCT Patent Application No. PCT/EP2017/073565, dated Dec. 1, 2017, 10 pages.

International Preliminary Report on Patentability received for PCT Patent Application No. PCT/EP2017/073565, dated Mar. 28, 2019, 8 pages.

Herre et al., "Spatial Audio Coding: Next-Generation Efficient and Compatible Coding of Multichannel Audio", 117th Convention of the Audio Engineering Society, Oct. 28-31, 2004, 13 pages.

Goodwin et al., "Primary-Ambient Signal Decomposition and Vector-Based Localization for Spatial Audio Coding and Enhancement", IEEE International Conference on Acoustics, Speech and Signal Processing, ICASSP, 2007, pp. I-9-I-12.

Goodwin et al., "Binaural 3D Audio Rendering Based on Spatial Audio Scene Coding", 123th Convention of the Audio Engineering Society, Convention Paper 7277, Oct. 5-8, 2007, 12 pages.

Goodwin et al., "Analysis and Synthesis for Universal Spatial Audio Coding", 121st Convention of the Audio Engineering Society, Convention Paper 6874, Oct. 5-8, 2006, 11 pages.

Goodwin et al., "A Frequency-Domain Framework for Spatial Audio Coding Based on Universal Spatial Cues", Convention Paper 6751, 120th Convention of the Audio Engineering Society, May 20-23, 2006, 12 pages.

European Search Report and Written Opinion received for EP Patent Application No. 16306190.6, dated Feb. 24, 2017, 5 pages.

Collins et al., "Visualized Sound Effect Icons for Improved Multimedia Accessibility: A Pilot Study", Entertainment Computing, vol. 3, 2012, pp. 11-17.

Breebaart et al., "MPEG Spatial Audio Coding / MPEG Surround: Overview and Current Status", 119th Convention of the Audio Engineering Society, Convention Paper 6599, Oct. 7-10, 2005, 17 pages.

Berge et al., "High Angular Resolution Plane Wave Expansion", Proc. of the 2nd International Symposium on Ambisonics and Spherical Acoustics, May 6-7, 2010, Paris, France, 6 pages.

Berge et al., "A New Method for B-Format to Binaural Transcoding", AES 40th International Conference, Tokyo, Japan, Oct. 8-10, 2010, 10 pages.

\* cited by examiner

METHOD FOR REPRODUCING SPATIALLY DISTRIBUTED SOUNDS

BACKGROUND OF THE INVENTION

The invention relates to a method for reproducing spatially distributed sounds of a multichannel audio signal.

Audio is an important medium for conveying any kind of information, especially sound direction information. Indeed, the human auditory system is more effective than the visual system for surveillance tasks. Thanks to the development of multichannel audio format, spatialization has become a common feature in all domains of audio: movies, video games, virtual reality, music, etc.

Typically, such sounds are mixed onto multiple audio channels, wherein each channel is fed to a dedicated loudspeaker. Distribution of a sound to the different channels is adapted to the configuration of the dedicated playback system (positions of the loudspeakers); so as to reproduce the intended directionality of said sound.

Multichannel audio streams thus require to be played back over suitable loudspeaker layouts. For instance, each of the channels of a five channel formatted audio signal is associated with its corresponding loudspeaker within a five loudspeaker array. FIG. 1 shows an example of a five channel loudspeaker layout recommended by the International Telecommunication Union (ITU) for the 5.1 surround sound configuration. There are a left loudspeaker L, right loudspeaker R, center loudspeaker C, surround left loudspeaker LS and surround right loudspeaker RS, arranged around a reference listening point O which is the recommended listeners position. With this reference listening point O as a center, the relative angular distances between the central directions of the loudspeakers are indicated.

A multichannel audio signal is thus encoded according to an audio file format dedicated to a prescribed spatial configuration where loudspeakers are arranged at prescribed positions to a reference listening point. Indeed, each time-dependent input audio signal of the multichannel audio signal is associated with a channel, each channel corresponding to a prescribed position of a loudspeaker.

If multichannel audio is played back over an appropriate sound system, i.e. with the required number of loudspeakers and correct angular distances between them, a normal hearing listener is able to detect the location of the sound sources that compose the multichannel audio mix. However, should the actual sound system exhibit inappropriate features, such as too few loudspeakers, or an inaccurate angular distance thereof, the directional information of the audio content may not be delivered properly to the listener.

Patent application WO2008/113428 discloses a technique a conversion between arbitrary multi-channel formats. An input multi-channel representation is converted into a different output multi-channel representation of a spatial audio signal. An intermediate representation of the spatial audio signal is derived, the intermediate representation having direction parameters indicating a direction of origin of a portion of the spatial audio signal. The output multi-channel representation of the spatial audio signal is generated using the intermediate representation of the spatial audio signal.

SUMMARY OF THE INVENTION

The method is intended to provide a method for reproducing spatially distributed sounds of a multichannel audio signal with an audio system comprising loudspeakers in an actual spatial configuration which is different of the prescribed spatial configuration associated with the format of the multichannel audio signal.

In accordance with a first aspect of the present invention, this object is achieved by a method for reproducing spatially distributed sounds of a multichannel audio signal with electroacoustic transducers positioned at actual positions with respect to a reference listening point in an actual spatial configuration, wherein the multichannel audio signal comprises time-dependent input audio signals, each time-dependent input audio signal being associated with an input channel, each channel corresponding to a prescribed position of a electroacoustic transducer with respect to the reference listening point in a prescribed spatial configuration, said method comprising the following steps:

receiving the time-dependent input audio signals, performing a time-frequency transform of said time-dependent input audio signals for converting each one of the time-dependent input audio signals into a plurality of time-frequency representations for the input channel associated with said time-dependent input audio signal, each time-frequency representation corresponding to a time-frequency tile defined by a time frame and a frequency sub-band, time-frequency tiles being the same for the different input channels, for each time-frequency tile, determining an active directional vector and a reactive directional vector from time-frequency representations of different input channels for said time-frequency tile, wherein the active directional vector is determined from a real part of a complex intensity vector and the reactive directional vector is determined from an imaginary part of the complex intensity vector;

for each time-frequency tile, determining positions of virtual sound sources with respect to the reference listening point in a virtual spatial configuration from the active directional vector and the reactive directional vector, and determining frequency signal values to each virtual sound sources, distributing the time-frequency signal values of said virtual sound sources to electroacoustic transducers on the basis of a comparison between the positions of the virtual sound sources in the virtual spatial configuration and the actual positions of said electroacoustic transducers in an actual spatial configuration, producing sounds through the electroacoustic transducers of the actual spatial configuration on the basis of the time-frequency signal values distributed to the electroacoustic transducers.

Other preferred, although non limitative, aspects of the method of the invention are as follows, isolated or in a technically feasible combination:

the active directional vector of a time-frequency tile is representative of the sound energy flow at the reference listening point for the time frame and a frequency sub-band of said time-frequency tile, and wherein the reactive directional vector is representative of acoustic perturbations at the reference listening point with respect to the sound energy flow;

each input channel is associated with a sound direction defined between the reference listening point and the prescribed position of the speaker associated with said input channel, and a sound velocity vector is determined as a function of a sum of each sound direction weighted by the time-frequency representation corresponding to the input channel associated with said sound direction, said sound velocity vector being used to determine the active directional vector and the reactive directional vector;

a sound pressure value defined by a sum of the time-frequency representations of the different input channels is used to determine the active directional vector and the reactive directional vector;

the complex intensity vector results from a complex product between a conjugate of the sound pressure value for a time-frequency tile and the sound velocity vector for said time-frequency tile;

for determining time-frequency signal values of each one of the virtual sound sources, virtual microphone signals are determined, each virtual microphone signal being associated with a virtual sound source and corresponding to the signal that would acquire a virtual microphone arranged at the reference listening point and oriented in the direction toward the position of said virtual sound source;

the time-frequency signal value of a virtual sound source is determined by suppressing, in the virtual microphone signal associated with said virtual sound source, the interferences from other virtual sound sources;

time-frequency signal values are affected to each one of the virtual sound sources on the basis of the direction of the active directional vector and of the direction of the reactive directional vector;

the virtual sound sources are arranged on a circle centered on the reference listening point;

distributing the time-frequency signal values of said virtual sound sources to electroacoustic transducers on the basis of a comparison between the positions of the virtual sound sources in the virtual spatial configuration and the actual positions of said electroacoustic transducers in an actual spatial configuration comprises:
  for each time-frequency tile, calculating a time-frequency audio output channel signal by summing the respective contributions of each virtual sound sources for that output channel associated with an electroacoustic transducer, and
  converting time-frequency audio output channel signals into time-dependent output channel signals;

each time-dependent output channel signal is fed to each corresponding electroacoustic transducer;

there are three virtual sound sources for each time-frequency tile, each virtual sound source having a position with respect to the reference listening point, wherein:
  a position of a first virtual sound source defines with the reference listening point a direction which is collinear to the direction of the active directional vector from the reference listening point,
  a position of a second virtual sound source defines with the reference listening point a direction which is collinear to the direction of the reactive directional vector with a first orientation,
  a position of a third virtual sound source defines with the reference listening point a direction which is collinear to the direction of the reactive directional vector with a second orientation opposite to the first orientation.

there are two virtual sound sources for each time-frequency tile, each virtual sound source having a position with respect to the reference listening point, and wherein:
  a position of a first virtual sound source defines with the reference listening point a direction resulting from the sum of the active directional vector and the reactive directional vector weighted by a positive factor, and
  a position of a second virtual sound source defines with the reference listening point a direction resulting from the sum of the active directional vector and the reactive directional vector weighted by a negative factor.

In accordance with a second aspect of the present invention, there is provided a non-transitory tangible computer-readable medium having computer executable instructions embodied thereon that, when executed by a computer, perform the method according to the first aspect.

In accordance with a third aspect of the present invention, there is provided a system for reproducing spatially distributed sounds of a multichannel audio signal, said system comprising:
  an input for receiving time-dependent input audio signals for a plurality of input channels,
  a processor and a memory for:
    performing a time-frequency transform of said time-dependent input audio signals for converting each one of the time-dependent input audio signals into a plurality of time-frequency representations for the input channel associated with said time-dependent input audio signal, each time-frequency representation corresponding to a time-frequency tile defined by a time frame and a frequency sub-band, time-frequency tiles being the same for the different input channels,
    for each time-frequency tile, determining an active directional vector and a reactive directional vector from time-frequency representations of different input channels for said time-frequency tile, wherein the active directional vector is determined from a real part of a complex intensity vector and the reactive directional vector is determined from an imaginary part of the complex intensity vector,
    for each time-frequency tile, determining positions of virtual sound sources with respect to the reference listening point in a virtual spatial configuration from the active directional vector and the reactive directional vector, and determining time-frequency signal values for each virtual sound sources,
    distributing the time-frequency signal values of said virtual sound sources to electroacoustic transducers on the basis of a comparison between the positions of the virtual sound sources in the virtual spatial configuration and the actual positions of said electroacoustic transducers in an actual spatial configuration; and
  an output for delivering time-dependent output channel signals to a plurality of electroacoustic transducers positioned at actual positions with respect to a reference listening point in an actual spatial configuration.

The system is configured for implementing the method according to the invention.

BRIEF DESCRIPTION OF THE DRAWINGS

Other aspects, objects and advantages of the present invention will become better apparent upon reading the following detailed description of preferred embodiments thereof, given as a non-limiting example, and made with reference to the appended drawings wherein.

DETAILED DESCRIPTION OF THE INVENTION

The method may be implemented by a system for reproducing spatially distributed sounds of a multichannel audio signal, said system comprising:
- an input for receiving time-dependent input audio signals for a plurality of input channels,
- a processor and a memory configured to implement to method of the invention,
- an output for delivering time-dependent output channel signals to a plurality of electroacoustic transducers positioned at actual positions with respect to a reference listening point in an actual spatial configuration.

Figure 1:
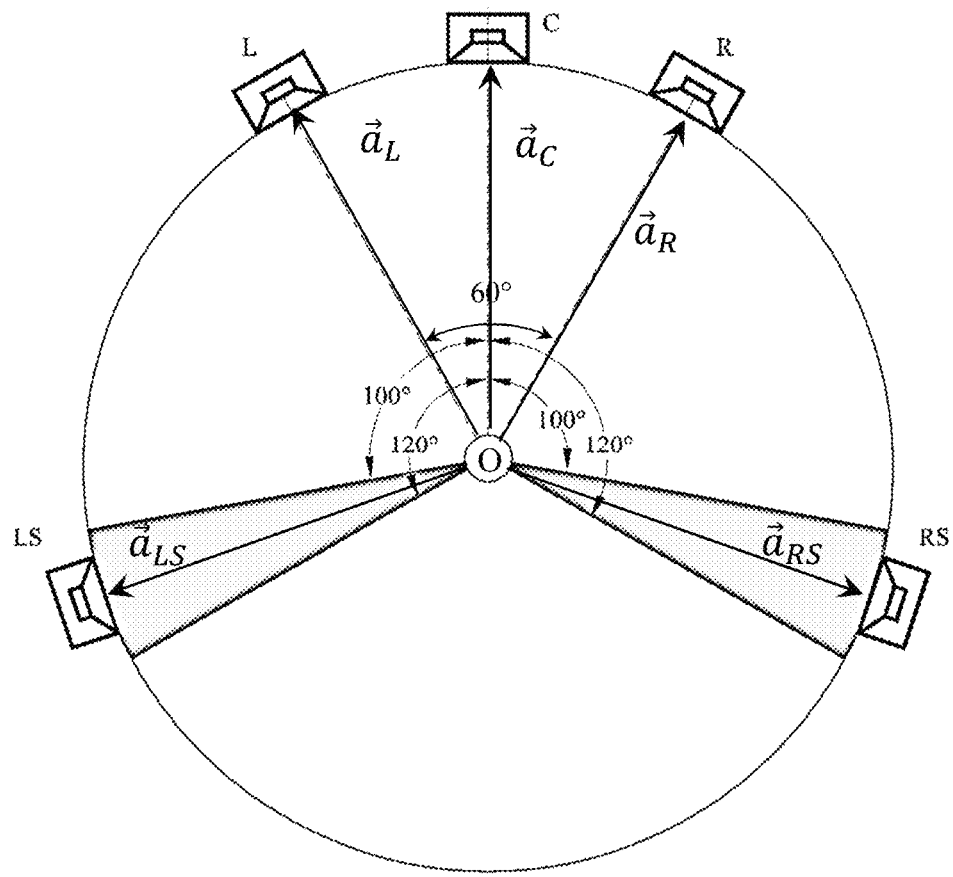
FIG. 1, already discussed, shows an example of prescribed positions of loudspeakers with respect to a reference listening point in a prescribed spatial configuration for multichannel audio system.

An input receives the multichannel audio signal comprising time-dependent input audio signals for a plurality of input channels (step S01). Each time-dependent input audio signal is associated with an input channel. Each input channel corresponds to a prescribed position of an electroacoustic transducer with respect to a reference listening point in a prescribed spatial configuration. For example, in the prescribed spatial configuration shown by FIG. 1, there are five input channels, one for each loudspeaker LS, L, C, R, RS.

Under the plane-wave model assumption, the position of a sound source (e.g. the location of each loudspeaker) may be defined solely by the direction of the sound source with respect to the reference listening point. A unitary vector is then sufficient to locate a sound source. Accordingly, each of the prescribed positions defines a unitary vector $\vec{a}_I$ representing the sound direction and originating from the reference listening point and pointing in the direction of each loudspeaker. As a result, each input channel i is associated with a sound direction $\vec{a}_I$ defined between the reference listening point and the prescribed position of the loudspeaker associated with said input channel i. For example, in the prescribed spatial configuration shown in FIG. 1, the location of the loudspeaker C is defined by the sound vector $\vec{a}_C$ that originates from the reference listening point O and towards the location of the loudspeaker C on the unitary circle. This sound vector $\vec{a}_C$ extends in the front of the listening point. In a similar way, the location of the loudspeaker L is defined by the sound vector $\vec{a}_L$ that originates from the reference listening point O and towards the location of the loudspeaker L on the unitary circle. In this example, the directions of the sound vector $\vec{a}_C$ and of the sound vector $\vec{a}_L$ are at an angle of 30°.

Figure 2:
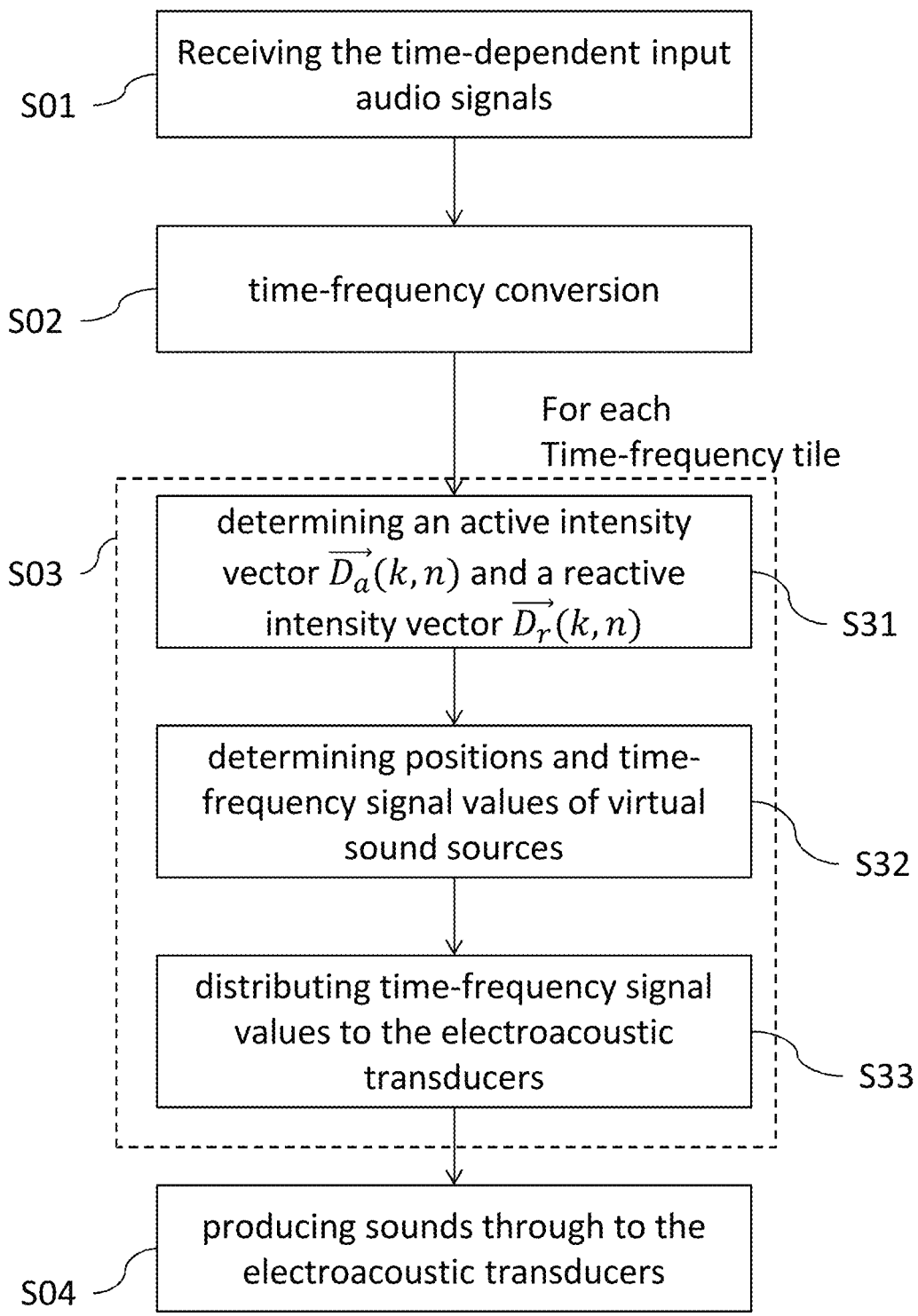
FIG. 2 is a diagram showing steps of the method.
Figure 3:
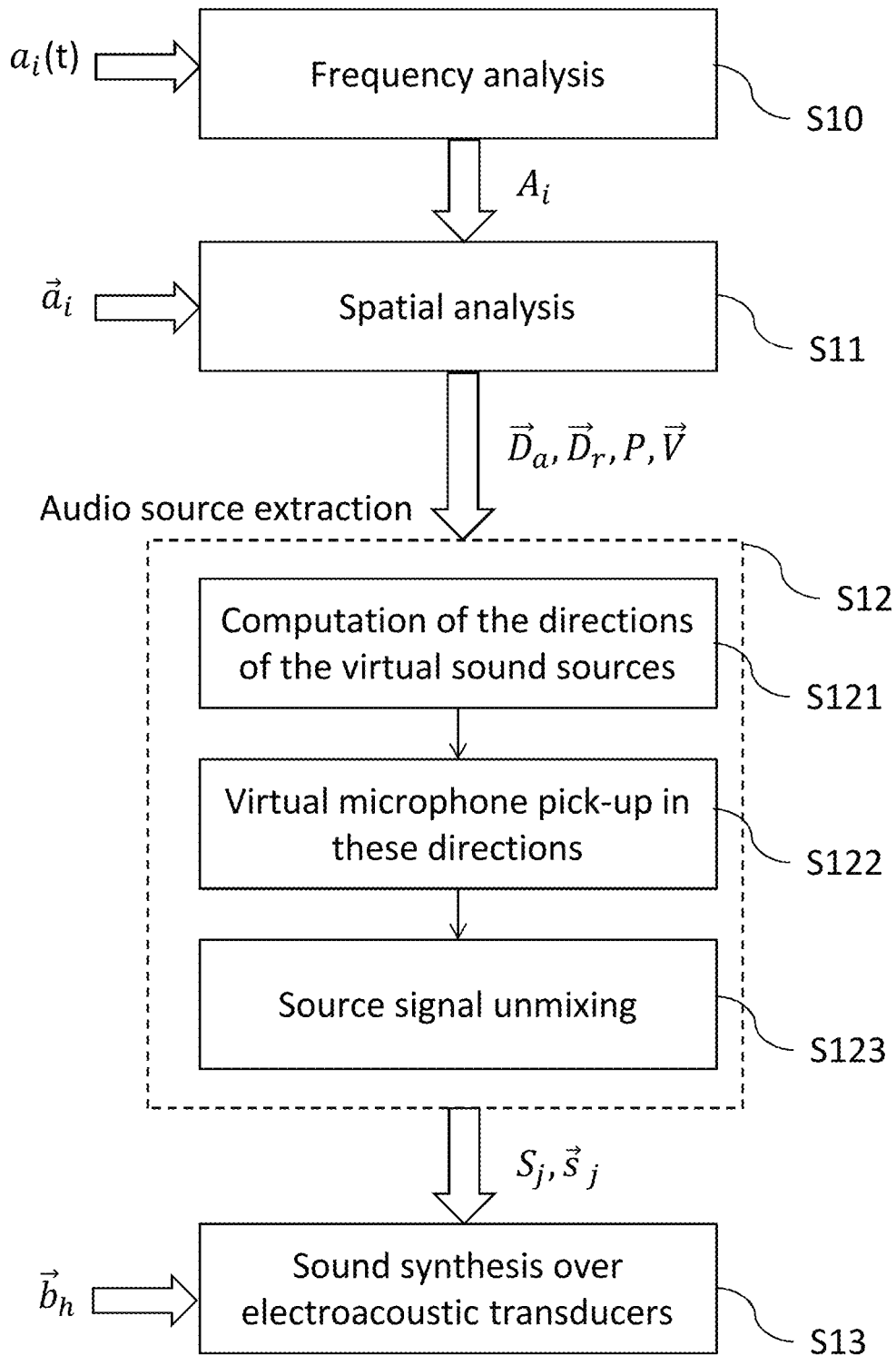
FIG. 3 is a diagram showing stages of the signal processing in the method.

However, the actual audio system intended to playback the multichannel audio signal comprises electroacoustic transducers positioned at actual positions with respect to the reference listening point in an actual spatial configuration. The method for reproducing spatially distributed sounds of a multichannel audio signal is described below in reference to FIG. 2 and FIG. 3. FIG. 2 shows the temporally organized steps of the method, while FIG. 3 shows the mathematical reasoning of the method.

Frequency Analysis

The received time-dependent input audio signals $a_i(t)$ may be analogue, but they preferably are digital signals. There are as many input audio signals $a_i(t)$ as input channels i. During the frequency analysis (step S10), the time-dependent input audio signals $a_i(t)$ are converted into the frequency domain by performing a time-frequency conversion (step S02). Typically, the time-frequency conversion uses a Fourier-related transform such as a Short-time Fourier transform (STFT), which is used to determine the sinusoidal frequency and phase content of local sections of a signal as it changes over time.

More precisely, each time-dependent input audio signal $a_i(t)$ is converted into a plurality of time-frequency representations $A_i(k,n)$ for the input channel i associated with said time-dependent input audio signal. Each time-frequency representation $A_i(k,n)$ corresponds to a time-frequency tile defined by a time frame and a frequency sub-band. The conversion is made on a frame-by-frame basis.

Preferably, the frame length is comprised between 5 ms and 80 ms. Preferably, the width of the frequency sub-band is comprised between 10 Hz and 200 Hz. Preferably the inter-frame spacing is comprised between $\frac{1}{16}^{th}$ and one half of the frame length. For instance, for a sampling rate of 48 kHz and an FFT-based STFT processing framework, the frame length may be of 1024 samples with a related frequency sub-band width (or bin width) of 46.875 Hz and an inter-frame spacing of 512 samples. The time-frequency tiles are the same for the different input channels i.

In the following, k is used as a frequency index of a frequency sub-band and n is a frame index, so that the time-frequency representation $A_i(k,n)$ refers to a complex number associated with the $k^{th}$ frequency sub-band and the $n^{th}$ frame of the signal of the input channel i.

The time-frequency representations $A_i(k,n)$ and the sound directions $\vec{a}_I$ are then used in a time-frequency processing (step S03) wherein the data of a time-frequency tile are processed.

Spatial Analysis

Spatial analysis (step S11) is performed from time-frequency representations $A_i(k,n)$ and the sound directions $\vec{a}_I$ of a time-frequency tile. For each time-frequency tile, an active directional vector $\vec{D}_a(k,n)$ and a reactive directional vector $\vec{D}_r(k,n)$ are determined (step S31) from time-frequency representations $A_i(k,n)$ of different input channels for said time-frequency tile.

The active directional vector $\vec{D}_a(k,n)$ of a time-frequency tile is proportional to the active acoustical intensity vector which is representative of the sound energy flow at the reference listening point for the time frame and the frequency sub-band of said time-frequency tile. More specifically, the active directional vector $\vec{D}_a(k,n)$ corresponds to the active acoustical intensity vector, normalized by the sum of the acoustic energies $E_P(k,n)$ and $E_K(k,n)$ at the reference listening point O, with an added minus sign in order to have it directed from the reference listening point O towards the unitary circle. It is possible to use a different normalization or to omit the minus sign, in which case the vectors would be pointing towards the reference listening point O.

The reactive directional vector $\vec{D}_r(k,n)$ is proportional to the reactive acoustical intensity vector which is representative of acoustic perturbations at the reference listening point with respect to the sound energy flow for the same time-frequency tile. More specifically, the reactive directional vector $\vec{D}_r(k,n)$ corresponds to the reactive acoustical intensity vector, normalized by the sum of the acoustic energies $E_P(k,n)$ and $E_K(k,n)$ at the reference listening point O. A minus sign is also added but could be omitted. As for the active directional vector, it is possible to use a different normalization.

From a perceptual point of view, if the active directional vector $\vec{D}_a(k,n)$ can be related to the primary directional sound field, the reactive directional vector $\vec{D}_r(k,n)$ is related to the ambient diffuse sound field. Moreover, the directional information of the reactive directional vector $\vec{D}_r(k,n)$ enables the handling of the spatial characteristics of this ambient sound field, and thus it can be used to describe not only totally diffused ambient sound fields but also partially diffused ones.

This new approach is by nature more robust as it takes benefits of the reliability of the active directional vector $\vec{D}_a(k,n)$ which is a true acoustical spatial cue (compared to the Gerzon vectors which are empiric perceptual cues), but also exploits the diffuseness of sound through the reactive directional vector $\vec{D}_r(k,n)$.

Figure 4:
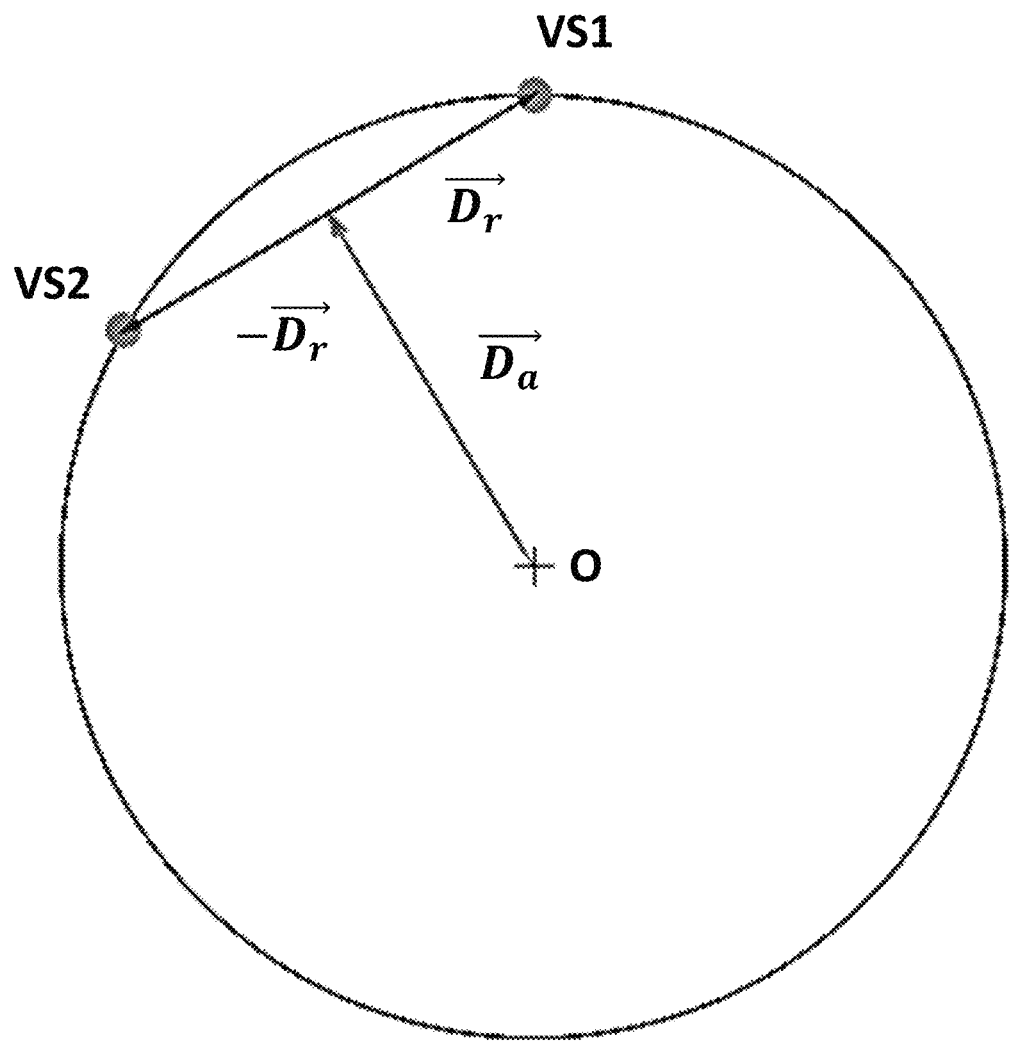
FIG. 4 shows schematically an example of a relationship between the active directional vector and the reactive directional vector with the locations of virtual sound sources.

It has been found that the combination of the active directional vector $\vec{D}_a(k,n)$ and the reactive directional vector $\vec{D}_r(k,n)$ may be used to identify the locations of sound sources, as depicted on FIG. 4. In this FIG. 4, sound distribution is represented by two virtual sound sources VS1 and VS2 arranged on a unitary circle centered on the reference listening point O. The active directional vector $\vec{D}_a(k,n)$ originates from the reference listening point O and is directed along the main acoustical flow. In this example, the two uncorrelated sound sources VS1, VS2 are of equal energy (for that time-frequency tile). As a result, the perceived acoustical energy flow at the reference listening point O comes from the middle of the two sound sources VS1, VS2, and therefore the active directional vector $\vec{D}_a(k,n)$ extends between the two sound sources VS1, VS2. The reactive directional vector $\vec{D}_r(k,n)$ is here perpendicular to the active directional vector $\vec{D}_a(k,n)$, and the location of a sound source VS1, VS2 corresponds to the sum of the active directional vector $\vec{D}_a(k,n)$ and of the reactive directional vector $\vec{D}_r(k,n)$ or of the opposite of the reactive directional vector $\vec{D}_r(k,n)$.

However, most of the time, the sound sources VS1, VS2 are not totally uncorrelated. It has been found that whatever the exact locations of the two sound sources VS1, VS2, the reactive intensity is maximal when the source signals are totally uncorrelated. Conversely, the reactive intensity is minimal when the source signals are totally correlated. In a similar way, where the sound source signals are totally uncorrelated, the reactive intensity is maximal when the source directions are spatially negatively correlated (i.e. opposite) with respect to the reference listening point O. Conversely, the reactive intensity is minimal when the source directions are spatially correlated (i.e. in the same direction) with respect to the reference listening point.

For determining the active directional vector $\vec{D}_a(k,n)$ and the reactive directional vector $\vec{D}_r(k,n)$, the prescribed positions of the loudspeakers with respect to the reference listening point O in a prescribed spatial configuration are used. As indicated above, each input channel i is associated with a sound direction $\vec{a}_i$ defined between the reference listening point O and the prescribed position of the loudspeaker associated with said input channel i.

A sound pressure value $P(k,n)$ for a time-frequency tile defined by a sum of the time-frequency representations $A_i(k,n)$ of the different input channels of the same for said time-frequency tile is determined:

$$P(k, n) = \sum_i A_i(k, n)$$

A sound velocity vector $\vec{V}(k,n)$ for the time-frequency tile is determined, said sound velocity vector $\vec{V}(k,n)$ being proportional to a sum of each sound direction $\vec{a}_i$ weighted by the time-frequency representation $A_i(k,n)$ corresponding to the input channel i associated with said sound direction $\vec{a}_i$:

$$\vec{V}(k, n) = -\frac{1}{\rho c} \sum_i A_i(k, n)\vec{a}_i = \begin{pmatrix} V_x(k, n) \\ V_y(k, n) \\ V_z(k, n) \end{pmatrix} \text{ where}$$

$$\begin{cases} V_x(k, n) = -\frac{1}{\rho c} \sum_i A_i(k, n)\vec{a}_i \cdot \vec{e}_x \\ V_y(k, n) = -\frac{1}{\rho c} \sum_i A_i(k, n)\vec{a}_i \cdot \vec{e}_y \\ V_z(k, n) = -\frac{1}{\rho c} \sum_i A_i(k, n)\vec{a}_i \cdot \vec{e}_z \end{cases}$$

with $\vec{e}_x$, $\vec{e}_y$, and $\vec{e}_z$ the unitary vectors of a coordinate system used as a reference frame for the virtual spatial configuration, $\rho$ the density of air and c the speed of sound. For example, the speed of sound in dry air at 20° C. is 343.2 meters per second, which may be approximated to 340 m·s$^{-1}$. At sea level and at 15° C., air density is approximately 1.225 kg/m$^3$, which may be approximated to 1.2 kg/m$^3$. Other values may be used.

A complex intensity vector $\vec{I}(k,n)$ resulting from a complex product between a conjugate of the sound pressure value P(k,n) for a time-frequency tile and the sound velocity vector $\vec{V}(k,n)$ for said time-frequency tile is determined:

$$\vec{I}(k,n) = P(k,n)^* \vec{V}(k,n)$$

and is used to determine the active directional vector $\vec{D}_a(k,n)$ and the reactive directional vector $\vec{D}_r(k,n)$ of said time-frequency tile. More precisely, the active directional vector $\vec{D}_a(k,n)$ is determined from the real part of the complex product $\vec{I}(k,n)$ and the reactive directional vector $\vec{D}_r(k,n)$ is determined from the imaginary part of the complex product $\vec{I}(k,n)$.

The active directional vector $\vec{D}_a(k,n)$ and the reactive directional vector $\vec{D}_r(k,n)$ may be calculated as follows:

$$\begin{cases} \vec{D}_a(k,n) = -\Re\left(\frac{\vec{I}(k,n)}{c(E_P(k,n)+E_K(k,n))}\right) \\ \vec{D}_r(k,n) = -\Im\left(\frac{\vec{I}(k,n)}{c(E_P(k,n)+E_K(k,n))}\right) \end{cases} \text{where}$$

$$\begin{cases} E_K(k,n) = \frac{\rho}{2}\vec{V}(k,n)^H\vec{V}(k,n) = \frac{\rho}{2}(|V_x(k,n)|^2 + |V_y(k,n)|^2 + |V_z(k,n)|^2) \\ E_P(k,n) = \frac{1}{2\rho c^2}P(k,n)*P(k,n) = \frac{1}{2\rho c^2}|P(k,n)|^2 \end{cases}$$

It shall be noted that the active directional vector $\vec{D}_a(k,n)$ and the reactive directional vector $\vec{D}_r(k,n)$ are here normalized by the energies $E_K(k,n)$ and $E_P(k,n)$, but could be calculated otherwise. It shall be noted that that a minus sign is added to the expressions of the active directional vector $\vec{D}_a(k,n)$ and reactive directional vector $\vec{D}_r(k,n)$ in order to have them directed from the reference listening point O towards the unitary circle. It would be possible to omit the minus sign, in which case the vectors would be pointing towards the reference listening point O.

Once the active directional vector $\vec{D}_a(k,n)$, the reactive directional vector $\vec{D}_r(k,n)$, the sound pressure value P(k,n) and the sound velocity vector $\vec{V}(k,n)$ (or the equivalents thereof) have been determined, it is possible to perform the audio source extraction (step S12) for determining positions and time-frequency signal values of virtual sound sources (step S32).

Audio Source Extraction

The method requires determining the attributes (position and time-frequency signal values) of virtual sound sources that will be used thereafter to determine the signals of the electroacoustic transducers of the actual spatial configuration.

For each time-frequency tile, the active directional vector $\vec{D}_a(k,n)$ and the reactive directional vector $\vec{D}_r(k,n)$ are used to determine the positions of the virtual sound sources with respect to the reference listening point in a virtual spatial configuration (step S32).

The determined positions of the virtual sound sources, the active directional vector $\vec{D}_a(k,n)$, the reactive directional vector $\vec{D}_r(k,n)$, the sound pressure value P(k,n) and the sound velocity vector $\vec{V}(k,n)$ are used to determine virtual first-order directional microphone signals (step S122) corresponding to the sounds that would be acquired by virtual microphones arranged at the reference listening point O and directed towards each virtual sound sources. There are as many virtual microphones as virtual sound sources.

A virtual microphone signal is a function of the sum of the sound pressure value P(k,n), and of the scalar product between the sound velocity vector $\vec{V}(k,n)$ and a unitary vector in the direction of a sound source, possibly weighted by the density of air ρ and the speed of sound c. For example, a virtual cardioid microphone signal $M_j(k,n)$ associated with a virtual sound source arranged in the direction defined by $\vec{s}_j(k,n)$ can be calculated as follows:

$$M_j(k,n) = \frac{P(k,n) + \rho c \vec{V}(k,n) \cdot \vec{s}_j(k,n)}{2}$$

A virtual microphone signal highlights the sound of the corresponding virtual sound source perceived at the reference listening point O, but also contains interferences from the other virtual sound sources. However, defining the virtual microphone signals for every virtual sound source allows identifying the virtual sound source signal of each virtual sound source.

It shall be noted that spatial manipulation may be performed by modifying the positions of the virtual sound sources. This approach is much safer than modifying the input channel data side defining the prescribed positions, because the original primary/ambient energy ratio is kept.

The details of the source extraction process however change depending on the number of virtual sound sources. The audio source extraction process estimates the locations and frequency signal values of virtual sound sources that generate the same sound field characteristics as the sound field defined by the time-dependent input audio signals in the prescribed configuration. Source-related sound field models need to be defined, as the audio source extraction process may be highly different from one model to another. Indeed, two models are reliable with the analysis based on the exploitation of both the active and reactive components of the acoustical intensity, a model with two sound sources and a model with three sound sources.

The "two-source" model handles the diffuseness (and thus makes use of the reactive component) as an indicator of the perceptual width of a sound source or local diffuseness. Two sound sources are sufficient to simulate a wider sound source, their spatial and signal correlation defining the perceived wideness of this composite sound source.

The "three-source" model handles the diffuseness (and thus makes use of the reactive component) as an indicator of the ambience level within the sound scene or global diffuseness. Two uncorrelated sound sources of opposite directions are suitable to simulate this ambient component.

It is explained below how to proceed with two virtual sound sources or three virtual sound sources.

Source Extraction: Two Virtual Sound Sources

Figure 5:
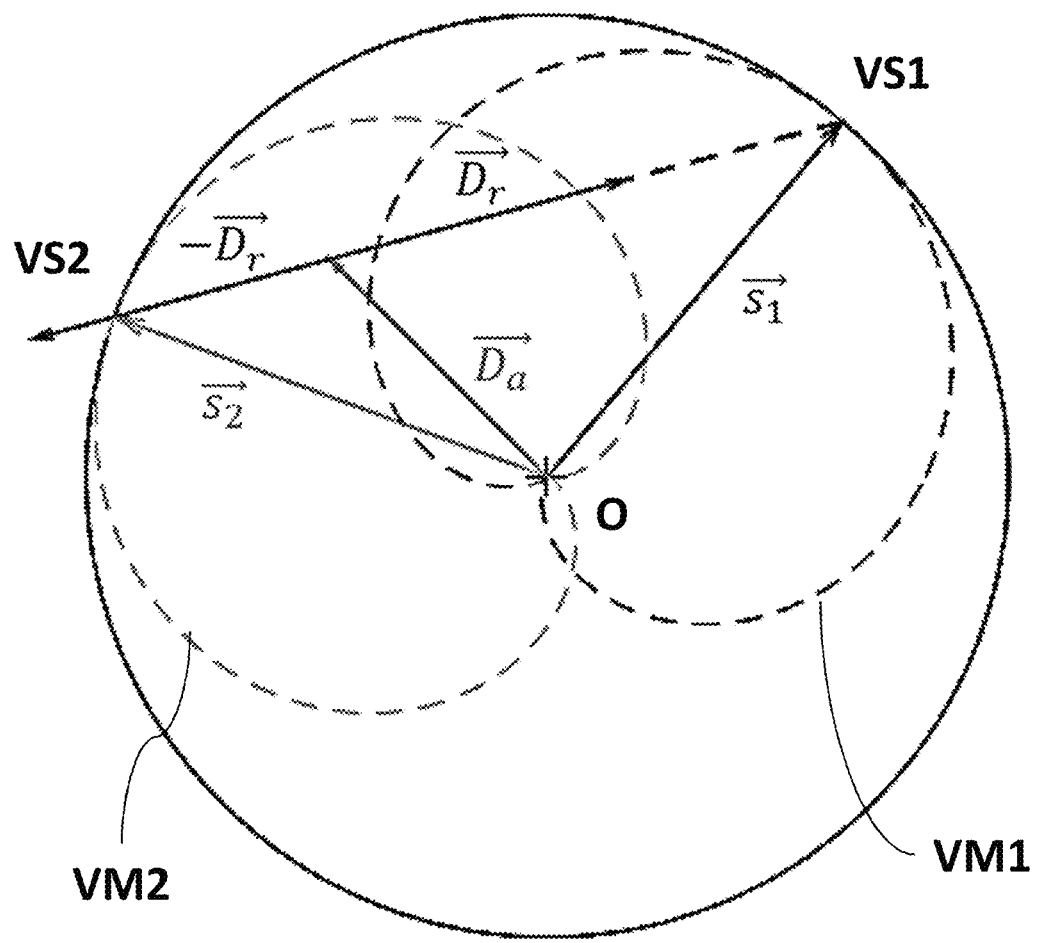
FIG. 5 shows schematically an example of a virtual spatial configuration with two virtual sound sources, and the active directional vector and the reactive directional vector, and the cardioids of the two corresponding virtual microphones.

In a spatial configuration of a unitary circle centered on the reference listening point O, the virtual sound sources are positioned on the unitary circle. A position of a virtual sound source is therefore at the intersection of the unitary circle with a directional line extending from the reference listening point. The position of each virtual sound source can be defined by a unitary source direction vector $\vec{s}_j(k,n)$ originating from the reference listening point. This is shown in FIG. 5.

As indicated above, the first step of the source extraction consists in determining the positions of the two virtual sound sources (step S121). As shown in FIG. 5, each unitary source direction vector $\vec{s}_j(k,n)$ is defined through the active directional vector $\vec{D}_a(k,n)$ and reactive directional vector $\vec{D}_r(k,n)$. More precisely, a virtual sound source is located at the intersection of the unitary circle and a line collinear with the reactive directional vector $\vec{D}_r(k,n)$ and passing through the tip of the active directional vector $\vec{D}_a(k,n)$ originating from the reference listening point.

If the analyzed sound field is generated by two uncorrelated sound sources (not necessary of equal energy), this technique enables to retrieve the exact location of those two sound sources. If the two sound sources used to generate the sound field tend to be in-phase (respectively opposite-phase), their exact locations cannot be retrieved anymore. The technique over-estimates (respectively under-estimates) the spatial correlation between the two sound source directions. However, this relationship between signal correlation and spatial correlation is perceptively coherent.

Determining the locations of the two virtual sound sources VS1, VS2 is equivalent to solving a geometry problem of the intersection of a line with a circle (or a sphere for three-dimensional sound field). Solving this problem is equivalent to solving a second order equation, which solutions are:

$$\begin{cases} \vec{s_1}(k,n) = \vec{D_a}(k,n) - \dfrac{\beta(k,n) + \sqrt{\Delta(k,n)}}{2\alpha(k,n)} \vec{D_r}(k,n) \\ \vec{s_2}(k,n) = \vec{D_a}(k,n) - \dfrac{\beta(k,n) + \sqrt{\Delta(k,n)}}{2\alpha(k,n)} \vec{D_r}(k,n) \end{cases} \text{with}$$

$$\begin{cases} \alpha(k,n) = \|\vec{D_r}(k,n)\|^2 \\ \beta(k,n) = 2\vec{D_a}(k,n) \cdot \vec{D_r}(k,n) \\ \Delta(k,n) = \beta(k,n)^2 - 4\alpha(k,n)\left(\|\vec{D_a}(k,n)\|^2 - 1\right) \end{cases}$$

It shall be noted that there are:

a position of a first virtual sound source VS1 defines, with the reference listening point O, a direction resulting from the sum of the active directional vector $\vec{D}_a(k,n)$ and the reactive directional vector $\vec{D}_r(k,n)$ weighted by a positive factor, and a position of a second virtual sound source VS2 defines, with the reference listening point O, a direction resulting from the sum of the active directional vector $\vec{D}_a(k,n)$ and the reactive directional vector $\vec{D}_r(k,n)$ weighted by a negative factor.

We thus have a source direction vector $\vec{s}_1(k,n)$ of a first virtual sound source VS1, and a source direction vector $\vec{s}_2(k,n)$ of a second virtual sound source VS2. As depicted in FIG. 5, these source direction vectors $\vec{s}_1(k,n)$, $\vec{s}_2(k,n)$ localize the virtual sound sources VS1, VS2 on the unitary circle centered on the reference listening point O.

As explained above, after the computation of the directions of the two virtual sound sources VS1, VS2, it is possible, by combining the sound pressure value P(k,n) and the sound velocity vector $\vec{V}(k,n)$ to the source direction vectors $\vec{s}_1(k,n)$, $\vec{s}_2(k,n)$, to create two virtual directional microphones. As depicted in FIG. 5, the two virtual directional microphones may have a cardioid directivity patterns VM1, VM2 in the directions of the source direction vectors $\vec{s}_1(k,n)$, $\vec{s}_2(k,n)$. The virtual microphone pick-up in these two directions may then be estimated by virtual microphone signals $M_1(k,n)$, $M_2(k,n)$ defined as follows:

$$\begin{cases} M_1(k,n) = \dfrac{P(k,n) + \rho c \vec{V}(k,n) \cdot \vec{s_1}(k,n)}{2} \\ M_2(k,n) = \dfrac{P(k,n) + \rho c \vec{V}(k,n) \cdot \vec{s_2}(k,n)}{2} \end{cases}$$

As explained above, each virtual microphone signal highlights the sound signal of the corresponding virtual sound source VS1, VS2 perceived at the reference listening point O, but also contains interferences from the other virtual sound source:

$$\begin{cases} M_1(k,n) = S_1(k,n) + \mu(k,n)S_2(k,n) \\ M_2(k,n) = S_2(k,n) + \mu(k,n)S_1(k,n) \end{cases} \text{with}$$

$$\mu(k,n) = \dfrac{1 + \vec{s_1}(k,n) \cdot \vec{s_2}(k,n)}{2}$$

where $S_1(k,n)$ is the time-frequency signal value of the first virtual sound source VS1 and $S_2(k,n)$ is the time-frequency signal value of the second virtual sound source VS2. A last processing step permits to extract the time-frequency signal values $S_1(k,n)$, $S_2(k,n)$ of each virtual sound source by unmixing the source signals from the virtual microphone signals (step S123):

$$\begin{cases} S_1(k,n) = \dfrac{S_{sum}(k,n) + S_{diff}(k,n)}{2} \\ S_2(k,n) = \dfrac{S_{sum}(k,n) - S_{diff}(k,n)}{2} \end{cases} \text{with}$$

$$\begin{cases} S_{sum}(k,n) = \dfrac{M_1(k,n) + M_2(k,n)}{1 + \mu(k,n)} \\ S_{diff}(k,n) = \dfrac{M_1(k,n) - M_2(k,n)}{1 - \mu(k,n)} \end{cases}$$

The positions of the two virtual sound sources VS1, VS2, defined by the source direction vectors $\vec{s}_1(k,n)$ and $\vec{s}_2(k,n)$, and their respective time-frequency signal values $S_1(k,n)$ and $S_2(k,n)$ have been determined.

It shall be noted that the two virtual sound sources VS1, VS2 are equivalent, in the sense that they contain both primary component (through the active directional vector $\vec{D}_a(k,n)$) and ambient components (through the reactive directional vector $\vec{D}_r(k,n)$). An ambience extraction processing may be performed for implementing additional refinement.

Audio Source Extraction: Three Virtual Sound Sources

Figure 7:
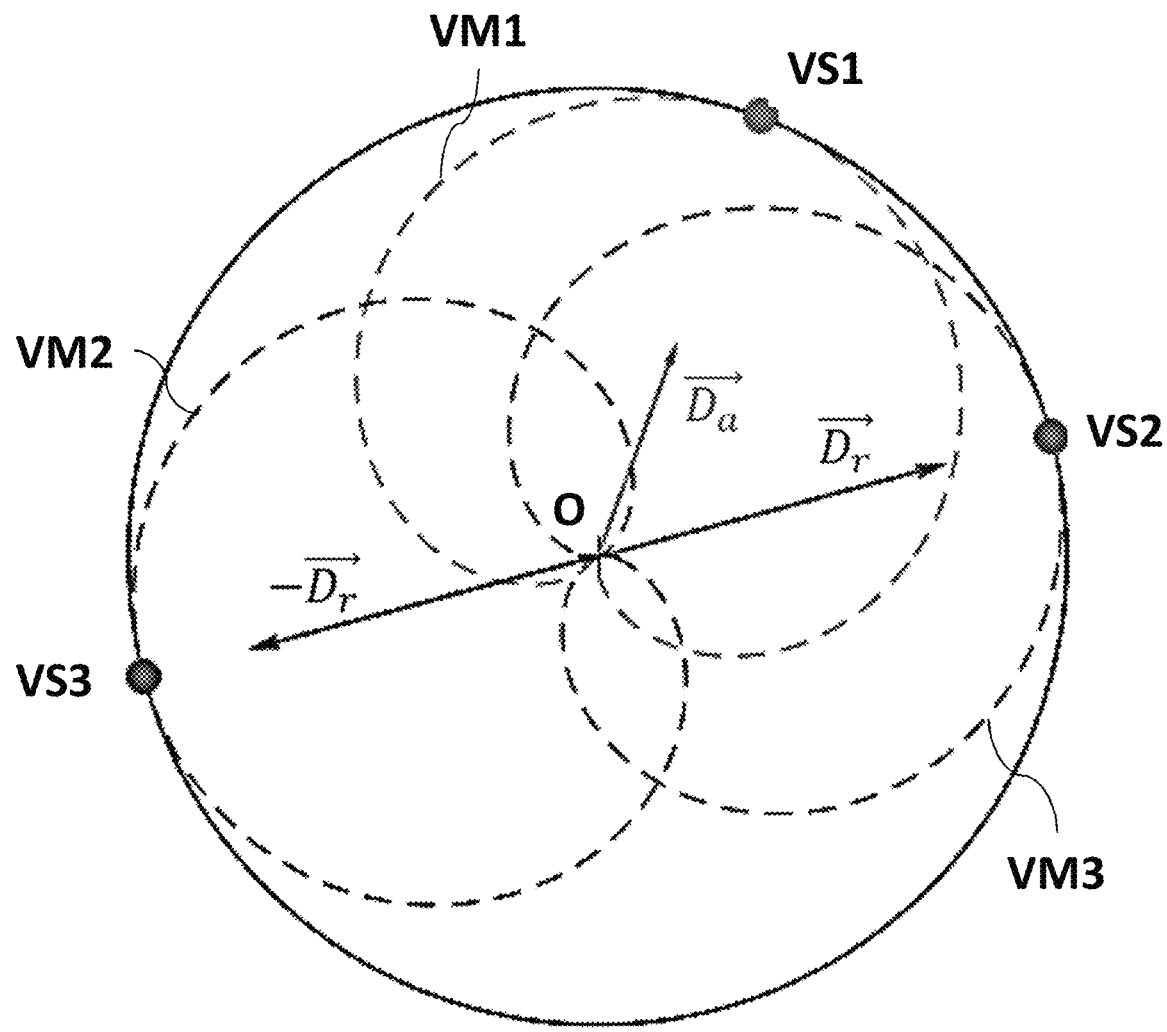
FIG. 7 shows schematically an example of a virtual spatial configuration with three virtual sound sources and the cardioids of the three corresponding virtual microphones, as well as the active directional vector and the reactive directional vector.

As explained before, the first step of the audio source extraction consists in determining the positions of the three virtual sound sources, through unitary source direction vectors $\vec{S}_j(k,n)$ defined by the active directional vector $\vec{D}_a(k,n)$ and reactive directional vector $\vec{D}_r(k,n)$. In a spatial configuration of a unitary circle centered on the reference listening point O, the virtual sound sources are positioned on the unitary circle. A position of a virtual sound source is therefore at the intersection of the unitary circle with a directional line extending from the reference listening point. The position of each virtual sound source can be defined by a unitary source direction vector $\vec{s}_j(k,n)$ originating from the reference listening point. The unitary source direction vector $\vec{s}_j(k,n)$ is defined through the active directional vector $\vec{D}_a(k,n)$ and reactive directional vector $\vec{D}_r(k,n)$. This is shown in FIG. 7.

As already explained, the active directional vector $\vec{D}_a(k,n)$ indicates the main perceptual sound event direction, the reactive intensity indicates the "direction of maximum perceptual diffuseness". Using three virtual sound sources VS1, VS2, VS3 thus appears relevant to approximate the sound field properties:

one virtual sound source VS1 is in the direction of the active directional vector $\vec{D}_a(k,n)$ to represent the reconstruction of the main acoustic flow, and two virtual sound sources VS2, VS3 negative spatially correlated, in the direction of the reactive directional vector $\vec{D}_r(k,n)$ and its opposite direction, respectively, to represent the acoustic perturbations of the acoustic field.

As a consequence, there are:

a position of a first virtual sound source VS1 defines with the reference listening point O a direction which is collinear to the direction of the active directional vector $\vec{D}_a(k,n)$ from the reference listening point, a position of a second virtual sound source VS2 defines with the reference listening point O a direction which is collinear to the direction of the reactive directional vector $\vec{D}_r(k,n)$ from the reference listening point with a first orientation, a position of a third virtual sound source VS3 defines with the reference listening point a direction which is collinear to the direction of the reactive directional vector $\vec{D}_r(k,n)$ from the reference listening point O with a second orientation opposite to the first orientation.

Indeed, determining the positions of the virtual sound sources VS1, VS2, VS3 is much simpler for the three-source model than for the two-source model, since their source direction vectors $\vec{s}_j(k,n)$ are directly computed from the active directional vector $\vec{D}_a(k,n)$ and the reactive directional vector $\vec{D}_r(k,n)$:

$$\begin{cases} \vec{s_1}(k,n) = \dfrac{\vec{D_a}(k,n)}{\|\vec{D_a}(k,n)\|^2} \\ \vec{s_2}(k,n) = \dfrac{\vec{D_r}(k,n)}{\|\vec{D_r}(k,n)\|^2} \\ \vec{s_3}(k,n) = \dfrac{\vec{D_r}(k,n)}{\|\vec{D_r}(k,n)\|^2} \end{cases}$$

with a first source direction vector $\vec{s}_1(k,n)$ of a first virtual sound source VS1, a second source direction vector $\vec{s}_2(k,n)$ of a second virtual sound source VS2, and a third source direction vector $\vec{s}_3(k,n)$ of a third virtual sound source VS3. As depicted in FIG. 7, these source direction vectors localize the virtual sound sources VS1, VS2, VS3 on the unitary circle centered on the reference listening point O.

As explained above, after the computation of the directions of the three virtual sound sources VS1, VS2, VS3, it is possible, by combining the sound pressure value P(k,n), the sound velocity vector $\vec{V}(k,n)$ to a source direction vector, to create three virtual directional microphones. As depicted in FIG. 7, the three virtual directional microphones may have a cardioid directivity patterns VM1, VM2, VM3 in the directions of the source direction vectors $\vec{s}_1(k,n)$, $\vec{s}_2(k,n)$, $\vec{s}_3(k,n)$. The virtual microphone pick-ups in these three directions may then be estimated by virtual microphone signals defined as follows:

$$\begin{cases} M_1(k,n) = \dfrac{P(k,n) + \rho c \vec{V}(k,n) \cdot \vec{s_1}(k,n)}{2} \\ M_2(k,n) = \dfrac{P(k,n) + \rho c \vec{V}(k,n) \cdot \vec{s_2}(k,n)}{2} \\ M_3(k,n) = \dfrac{P(k,n) + \rho c \vec{V}(k,n) \cdot \vec{s_3}(k,n)}{2} \end{cases}$$

As explained above, each virtual microphone signal $M_1(k,n)$, $M_2(k,n)$, $M_3(k,n)$ highlights the sound of the corresponding virtual sound source VS1, VS2, VS3 perceived at the reference listening point O, but also contains interferences from the other virtual sound source VS1, VS2, VS3. More precisely, since the second source direction vector $\vec{s}_2(k,n)$ and the third source direction vector $\vec{s}_3(k,n)$ are of opposite direction, interference between the second virtual sound source VS2 and the third virtual sound source VS3 is negligible, whereas they both interfere with the first virtual sound source VS1:

$$\begin{cases} M_1(k,n) = S_1(k,n) + \mu_{12}(k,n)S_2(k,n) + \mu_{13}(k,n)S_3(k,n) \\ M_2(k,n) = S_2(k,n) + \mu_{12}(k,n)S_1(k,n) \\ M_3(k,n) = S_3(k,n) + \mu_{13}(k,n)S_1(k,n) \end{cases} \text{with}$$

-continued $$\begin{cases} \mu_{12}(k,n) = \dfrac{1+\vec{s_1}(k,n)\cdot\vec{s_2}(k,n)}{2} = \dfrac{1+\dfrac{\overrightarrow{D_a(k,n)}}{\|\overrightarrow{D_a(k,n)}\|}\cdot\dfrac{\overrightarrow{D_r(k,n)}}{\|\overrightarrow{D_r(k,n)}\|}}{2} \\ \mu_{13}(k,n) = \dfrac{1+\vec{s_1}(k,n)\cdot\vec{s_3}(k,n)}{2} = \dfrac{1-\dfrac{\overrightarrow{D_a(k,n)}}{\|\overrightarrow{D_a(k,n)}\|}\cdot\dfrac{\overrightarrow{D_r(k,n)}}{\|\overrightarrow{D_r(k,n)}\|}}{2} \end{cases}$$

A last processing step (step S123) permits to extract the time-frequency signal value of each virtual sound source by unmixing the source time-frequency values:

$$\begin{cases} S_1(k,n) = \dfrac{M_1(k,n) - (\mu_{12}(k,n)M_2(k,n) + \mu_{13}(k,n)M_3(k,n))}{1 - (\mu_{12}(k,n)^2 + \mu_{13}(k,n)^2)} \\ S_2(k,n) = M_2(k,n) - \mu_{12}(k,n)S_1(k,n) \\ S_3(k,n) = M_3(k,n) - \mu_{13}(k,n)S_1(k,n) \end{cases}$$

Contrary to the model with two virtual sound sources, the three virtual sound sources are already decomposed between primary components and ambient components:
 the first virtual sound source VS1 corresponds to the primary component, and
 the second virtual sound source VS2 and third virtual sound source VS3 correspond to the ambient components. As a result, further refinement may be directly implemented without requiring an additional ambience extraction processing.

Sound Synthesis

Once the attributes of the virtual sound sources have been determined (positions and time-frequency signal values), sound synthesis may be performed (step S13). The time-frequency signal values $S_j(k,n)$ of said virtual sound sources may be distributed (step S33) to electroacoustic transducers on the basis of a comparison between the positions of the virtual sound sources in the virtual spatial configuration and the actual positions of said electroacoustic transducers in an actual spatial configuration. This might be called spatial synthesis.

Figure 6:
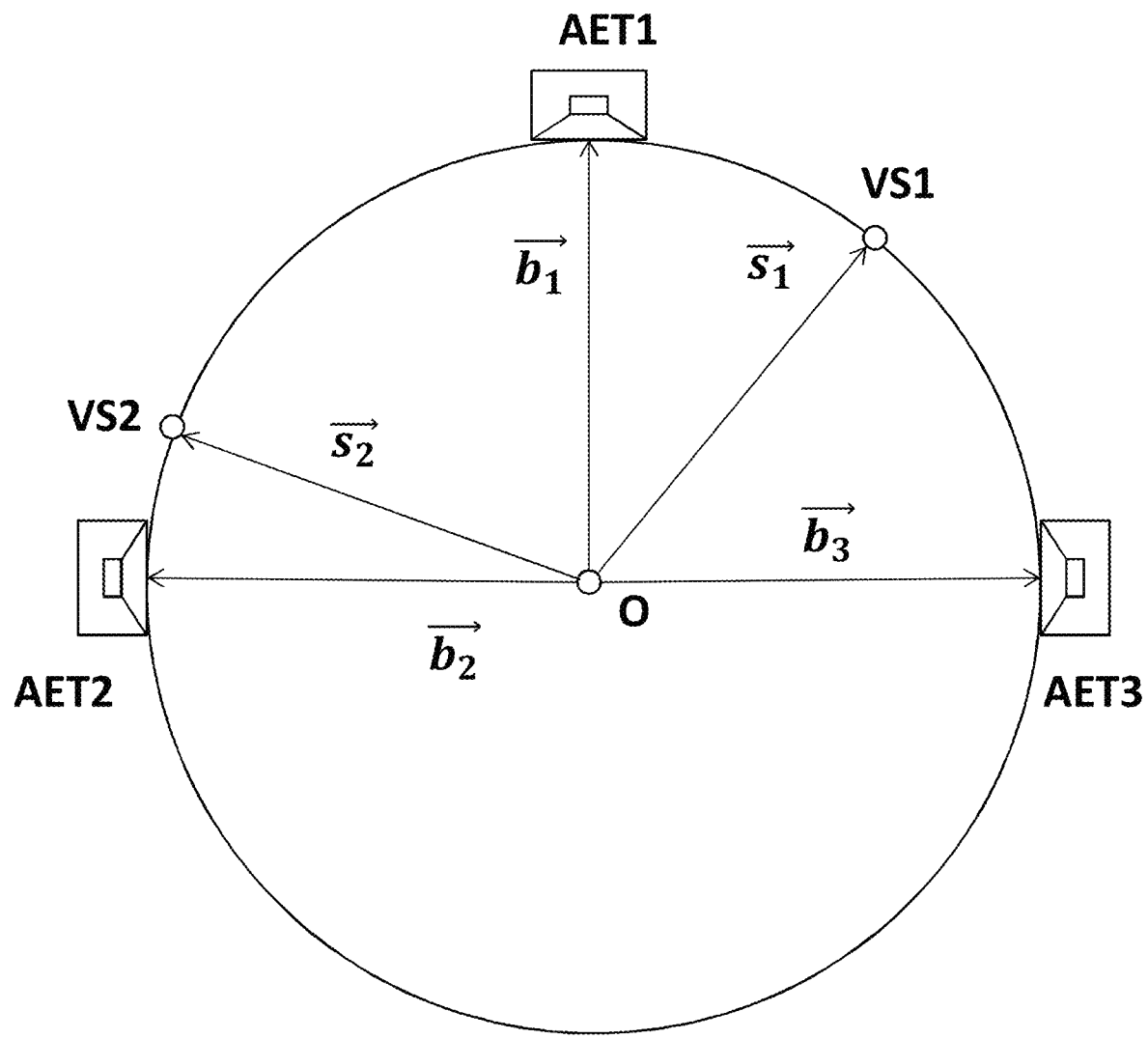
FIG. 6 shows schematically an example of an actual spatial configuration of three electroacoustic transducers and the two virtual sound sources of FIG. 5.
Figure 8:
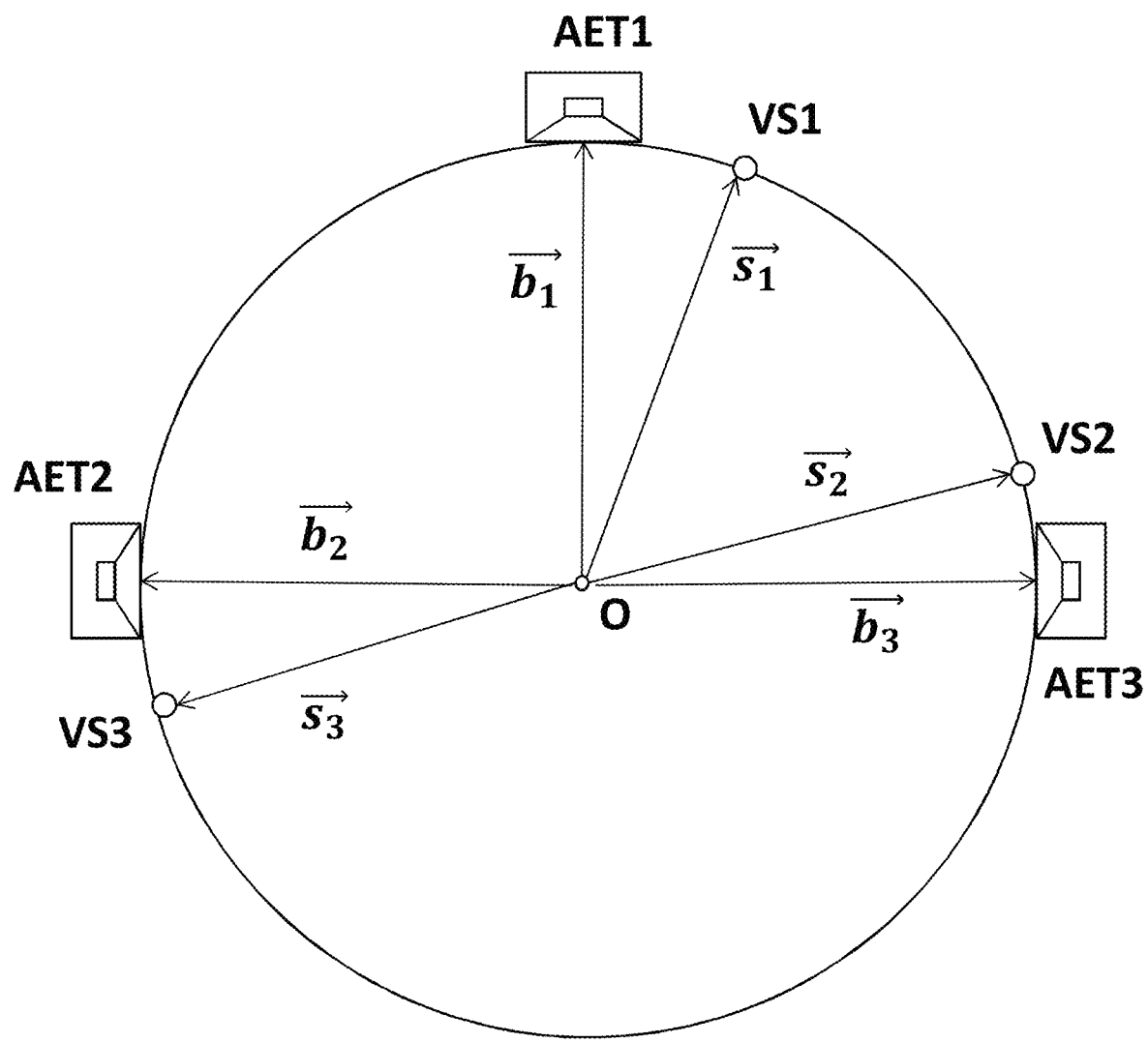
FIG. 8 shows schematically an example of an actual spatial configuration of three electroacoustic transducers and the three virtual sound sources of FIG. 7.

For doing so, spatial data relative to the actual positions of each electroacoustic transducer h are used. Spatial data are exemplified by actual source direction vectors $\vec{b}_h$ with h=1, 2, 3, . . . ) originating from the reference listening point O and pointing in the direction of each electroacoustic transducer, as shown in FIG. 6 and FIG. 8. Both FIG. 6 and FIG. 8 show the same actual spatial configuration with three electroacoustic transducers AET1, AET2, AET3 positioned at actual positions with respect to a reference listening point O. The first electroacoustic transducer AET1 is arranged on the front of the reference listening point O, in a direction denoted by a first actual source direction vector $\vec{b}_1$. The second electroacoustic transducer AET2 is arranged on the left of the reference listening point O, in a direction denoted by a second actual source direction vector $\vec{b}_2$, at a right angle with the first actual source direction vector $\vec{b}_1$. The third electroacoustic transducer AET3 is arranged on the right of the reference listening point O, in a direction denoted by a third actual source direction vector $\vec{b}_3$, opposite to the second actual source direction vector $\vec{b}_2$. This is a mere example, and the method is not limited to a particular spatial layout of the electroacoustic transducers or to a particular number of electroacoustic transducers. The electroacoustic transducers may be loudspeaker, but also headphone.

For each time-frequency tile, the various time-frequency signal values $S_j(k,n)$, associated virtual source direction vector $\vec{s}_j(k,n)$, are used in conjunction with actual source direction vectors $\vec{b}_h(k,n)$ in order to derive panning gains $G_{jh}(k,n)$. Panning gains $G_{jh}(k,n)$ define the sound level (and potentially phase) of each virtual sound source j within the output channel fed to the electroacoustic transducer h, for the time-frequency tile (k,n).

A panning gain $G_{jh}(k,n)$ is determined by considering the geometric relationships between the virtual source direction vector $\vec{s}_j(k,n)$ of the considered virtual sound source and the actual source direction vector $\vec{b}_h$ of an electroacoustic transducer. To make it simple, the virtual source direction vector $\vec{s}_j(k,n)$ is in some way projected onto the actual source direction vector $\vec{b}_h(k,n)$. For example, in FIG. 6, the second virtual sound source VS2 is much closer to the second electroacoustic transducer AET2 than the other electroacoustic transducer AET1, AET3. The panning gain $G_{22}(k,n)$ will be greater than $G_{12}(k,n)$ or $G_{23}(k,n)$. Of course, in practice, a more complex trigonometric formulation or a vector based formulation may be used. For instance, Vector-Based Amplitude Panning (VBAP) may be used, as disclosed by Ville Pulkki in "Virtual Sound Source Positioning Using Vector Base Amplitude Panning", Audio Engineering Society, Inc, 1997.

It shall be noted that it is possible to also implement a head-related transfer function (HRTF) processing in order to synthesize a binaural sound. Since the HRTF may depend on the virtual sound source location, a set of predetermined HRTFs may be stored, and the HRTF to be used selected on the basis of the locations of the virtual sound sources, as explained by Michael M. Goodwin and Jean-Marc Jot in "Binaural 3D audio rendering based on spatial audio scene coding", Audio Engineering Society, $123^{rd}$ Convention, New York, N.Y., 2007.

For the same frequency bin, a virtual source direction vector $\vec{s}_j(k,n)$ may vary rapidly from one frame to the next one. As a result, the panning gains $G_{jh}(k,n)$, may also vary abruptly from one frame to the next one. The panning gains $G_{jh}(k,n)$ may be smoothed by combining at least two temporally successive panning gains $G_{jh}(k,n)$ of the same frequency bin, such as:

$$\hat{G}_{jh}(k,n) = \lambda \hat{G}_{jh}(k,n-1) + (1-\lambda)G_{jh}(k,n)$$

with $\lambda$ a real number between 0 and 1.

For each time-frequency tile, the time-frequency audio output channel signal $B_h(k,n)$ is then calculated by summing the respective contributions of each virtual sound source for that output channel:

$$B_h(k,n) = \sum_j S_j(k,n)\hat{G}_{jh}(k,n)$$

The time-frequency audio output channel signals $B_h(k,n)$ are then converted back into time-dependent output channel signals $b_h(t)$. An Inverse Short-Time Fourier Transformation (ISTFT) may be used for that purpose.

Finally, each time-dependent output channel signal $b_h(t)$ is fed to each corresponding electroacoustic transducer, i.e.

the electroacoustic transducer of said output channel. The electroacoustic transducer then produces sounds from the received time-dependent output channel signals $b_h(t)$ (step S04).

The method of the present invention as described above can be realized as a program and stored into a non-transitory tangible computer-readable medium, such as CD-ROM, ROM, hard-disk, having computer executable instructions embodied thereon that, when executed by a computer, perform the method according to the invention.

While the present invention has been described with respect to certain preferred embodiments, it will be apparent to those skilled in the art that various changes and modifications may be made without departing from the scope of the invention as defined in the appended claims.

The invention claimed is:

1. A method for reproducing spatially distributed sounds of a multichannel audio signal with electroacoustic transducers positioned at actual positions with respect to a reference listening point in an actual spatial configuration, wherein the multichannel audio signal comprises time-dependent input audio signals, each time-dependent input audio signal being associated with an input channel, each channel corresponding to a prescribed position of a electroacoustic transducer with respect to the reference listening point (0) in a prescribed spatial configuration, said method comprising the following steps:

receiving the time-dependent input audio signals, performing a time-frequency conversion of said time-dependent input audio signals for converting each one of the time-dependent input audio signals into a plurality of time-frequency representations for the input channel associated with said time-dependent input audio signal, each time-frequency representation corresponding to a time-frequency tile defined by a time frame and a frequency sub-band, for each time-frequency tile, determining an active directional vector and a reactive directional vector from time-frequency representations of different input channels for said time-frequency tile, wherein the active directional vector is determined from a real part of a complex intensity vector and the reactive directional vector is determined from an imaginary part of the complex intensity vector, for each time-frequency tile, determining positions of virtual sound sources with respect to the reference listening point in a virtual spatial configuration from the active directional vector and the reactive directional vector and determining frequency signal values to each virtual sound sources, distributing the time-frequency signal values of said virtual sound sources to electroacoustic transducers based on a comparison between the positions of the virtual sound sources in the virtual spatial configuration and the actual positions of said electroacoustic transducers in an actual spatial configuration, producing sounds through the electroacoustic transducers of the actual spatial configuration based on the time-frequency signal values distributed to the electroacoustic transducers.

2. The method of claim 1, wherein the active directional vector of a time-frequency tile is representative of a sound energy flow at the reference listening point for the time frame and a frequency sub-band of said time-frequency tile, and wherein the reactive directional vector is representative of acoustic perturbations at the reference listening point with respect to the sound energy flow.

3. The method according to claim 1, wherein each input channel is associated with a sound direction defined between the reference listening point and the prescribed position of the speaker associated with said input channel, and a sound velocity vector is determined as a function of a sum of each sound direction weighted by the time-frequency representation corresponding to the input channel associated with said sound direction, said sound velocity vector being used to determine the active directional vector and the reactive directional vector.

4. The method according to claim 3, wherein a sound pressure value defined by a sum of the time-frequency representations of the different input channels is used to determine the active directional vector and the reactive directional vector, and wherein the complex intensity vector results from a complex product between a conjugate of the sound pressure value for a time-frequency tile and the sound velocity vector for said time-frequency tile.

5. The method according to claim 1, wherein a sound pressure value defined by a sum of the time-frequency representations of the different input channels is used to determine the active directional vector and the reactive directional vector.

6. The method according to claim 1, wherein for determining time-frequency signal values of each one of the virtual sound sources, virtual microphone signals are determined, each virtual microphone signal being associated with a virtual sound source and corresponding to the signal that would acquire a virtual microphone arranged at the reference listening point and oriented in the direction toward the position of said virtual sound source.

7. The method according to claim 6, wherein the time-frequency signal value of a virtual sound source is determined by suppressing, in the virtual microphone signal associated with said virtual sound source, interferences from other virtual sound sources.

8. The method according to claim 6, wherein the virtual sound sources are arranged on a circle centered on the reference listening point and a virtual microphone signal corresponds to the signal that would acquire a virtual cardioid microphone having an cardioid directivity pattern in the shape of a cardioid tangential to the circle centered on the reference listening point.

9. The method according to claim 1, wherein distributing the time-frequency signal values of said virtual sound sources to electroacoustic transducers based on a comparison between the positions of the virtual sound sources in the virtual spatial configuration and the actual positions of said electroacoustic transducers in an actual spatial configuration comprises:

for each time-frequency tile, calculating a time-frequency audio output channel signal by summing the respective contributions of each virtual sound sources for that output channel associated with an electroacoustic transducer, and converting time-frequency audio output channel signals into time-dependent output channel signals.

10. The method according to claim 9, wherein each time-dependent output channel signal is fed to each corresponding electroacoustic transducer.

11. The method according to claim 1, wherein there are three virtual sound sources for each time-frequency tile, each virtual sound source having a position with respect to the reference listening point, wherein:

a position of a first virtual sound source defines with the reference listening point a direction which is collinear to the direction of the active directional vector from the reference listening point, a position of a second virtual sound source defines with the reference listening point a direction which is collinear to the direction of the reactive directional vector with a first orientation, a position of a third virtual sound source defines with the reference listening point a direction which is collinear to the direction of the reactive directional vector with a second orientation opposite to the first orientation.

12. The method according to claim 1, wherein there are two virtual sound sources for each time-frequency tile, each virtual sound source having a position with respect to the reference listening point, and wherein:

a position of a first virtual sound source defines with the reference listening point a direction resulting from the sum of the active directional vector and the reactive directional vector weighted by a positive factor, and a position of a second virtual sound source defines with the reference listening point a direction resulting from the sum of the active directional vector and the reactive directional vector weighted by a negative factor.

13. A non-transitory tangible computer-readable medium having computer executable instructions embodied thereon that, when executed by a computer, perform the method of any one of claim 1.

14. A system for reproducing spatially distributed sounds of a multichannel audio signal, said system comprising:

an input for receiving time-dependent input audio signals for a plurality of input channels, a processor and a memory for:

performing a time-frequency transform of said time-dependent input audio signals for converting each one of the time-dependent input audio signals into a plurality of time-frequency representations for the input channel associated with said time-dependent input audio signal, each time-frequency representation corresponding to a time-frequency tile defined by a time frame and a frequency sub-band, for each time-frequency tile, determining an active directional vector and a reactive directional vector from time-frequency representations of different input channels for said time-frequency tile, wherein the active directional vector is determined from a real part of a complex intensity vector and the reactive directional vector is determined from an imaginary part of the complex intensity vector, for each time-frequency tile, determining positions of virtual sound sources with respect to the reference listening point in a virtual spatial configuration from the active directional vector and the reactive directional vector, and determining time-frequency signal values for each virtual sound sources, distributing the time-frequency signal values of said virtual sound sources to electroacoustic transducers based on a comparison between the positions of the virtual sound sources in the virtual spatial configuration and the actual positions of said electroacoustic transducers in an actual spatial configuration; and an output for delivering time-dependent output channel signals to a plurality of electroacoustic transducers positioned at actual positions with respect to a reference listening point in an actual spatial configuration.

* * * * *